United States Patent [19]

Shinohara et al.

[11] 4,109,548
[45] Aug. 29, 1978

[54] PARALLEL INDEXING CAM STRUCTURE

[76] Inventors: Shigeyuki Shinohara, 5-52-1-510 Jingumae, Shibuya-ku, Tokyo; Hiroshi Makino, R1-31, 1-2-10 Kitashin, Kofu City, Yamanashi Prefecture, both of Japan

[21] Appl. No.: 704,094

[22] Filed: Jul. 9, 1976

[30] Foreign Application Priority Data

Jun. 27, 1975 [JP] Japan .................. 50-90840[U]

[51] Int. Cl.² .............. F16H 53/06; B23B 29/24; B23Q 17/00
[52] U.S. Cl. ......................... 74/569; 74/70; 74/817
[58] Field of Search ............... 74/568 R, 568 T, 569, 74/567, 84, 816, 820, 821, 125, 122, 112, 435, 436, 437, 70, 817; 192/18 B

[56] References Cited

U.S. PATENT DOCUMENTS

| | | | |
|---|---|---|---|
| 1,847,768 | 3/1932 | Kolbassieff | 74/84 |
| 1,900,387 | 3/1933 | Lewis | 74/820 UX |
| 2,560,686 | 7/1951 | Curtis | 74/820 X |
| 2,579,368 | 12/1951 | Curtis et al. | 74/820 X |
| 2,866,353 | 12/1958 | Ewing | 74/435 X |
| 2,986,949 | 6/1961 | Lancaster et al. | 74/84 |
| 3,170,333 | 2/1965 | Umbricht | 74/84 |
| 3,232,447 | 2/1966 | Umbricht et al. | 74/820 X |
| 3,587,797 | 6/1971 | Szekely et al. | 192/18 B |
| 3,600,616 | 8/1971 | Yokoyama | 192/18 B X |
| 3,674,122 | 7/1972 | Buisker | 192/18 B X |
| 3,750,786 | 8/1973 | Toyohama et al. | 192/18 B X |
| 3,978,948 | 9/1976 | Baer | 192/18 B |

Primary Examiner—Samuel Scott
Assistant Examiner—Don E. Ferrell

[57] ABSTRACT

A parallel indexing cam structure has a locking cam and a pair of further cams which are rigidly secured to an input shaft at predetermined angular positions relative to each other, and a cam follower device is rigidly secured to an output shaft parallel to the input shaft and has a plurality of spider plates and three sets of cam follower rollers. During the dwell period, the locking cam is contacted by two rollers of one set of the cam follower rollers while the further cams are contacted by only one of the rollers of the respective remaining sets. The locking cam has a larger profile circle at the dwell position during the dwell period than the further cams, thereby blocking the rotation of the output shaft with increased accuracy and stiffness during the dwell period.

1 Claim, 6 Drawing Figures

PARALLEL INDEXING CAM STRUCTURE

BACKGROUND OF THE INVENTION

1. Field of the Invention

This invention relates to a parallel indexing cam structure, and more particularly to the structure of a cam assembly which includes three cams and the corresponding cam follower means, both of which are secured to respective shafts positioned parallel to each other.

2. Description of the Prior Art

The known parallel indexing cam structure of the type disclosed herein has an arrangement of two cams and corresponding cam means, and the cams and cam follower means have only a few points of contact and have a large angle of pressure during the dwell and indexing period. Such an arrangement has disadvantages from the standpoint of accuracy and stability with which the cam follower means are maintained in a given position during the dwell period.

SUMMARY OF THE INVENTION

It is therefore a principal object of the present invention to provide a parallel indexing cam structure which permits the three cams and corresponding cam follower means to have a reduced angle of pressure during the dwell and indexing period, so that the cam follower means dwell with greater accuracy and stability.

In accordance with the present invention, the structure of the cam assembly includes three cams having predetermined profiles secured to a drive or input shaft and the corresponding follow members rotatably secured to a follower spider assembly which in turn is secured to a driven or output shaft, whereby the cams and follower rollers can engage each other at reduced angles of pressure which make the follower rollers dwell with greater accuracy and stability.

It is another object of the present invention to provide a one revolution-and-stop apparatus operated by a one indexing step mode.

Other objects, features and advantages of the invention will become apparent from the description of the specification which follows.

DETAILED DESCRIPTION OF THE PREFERRED EMBODIMENTS

Figure 1:
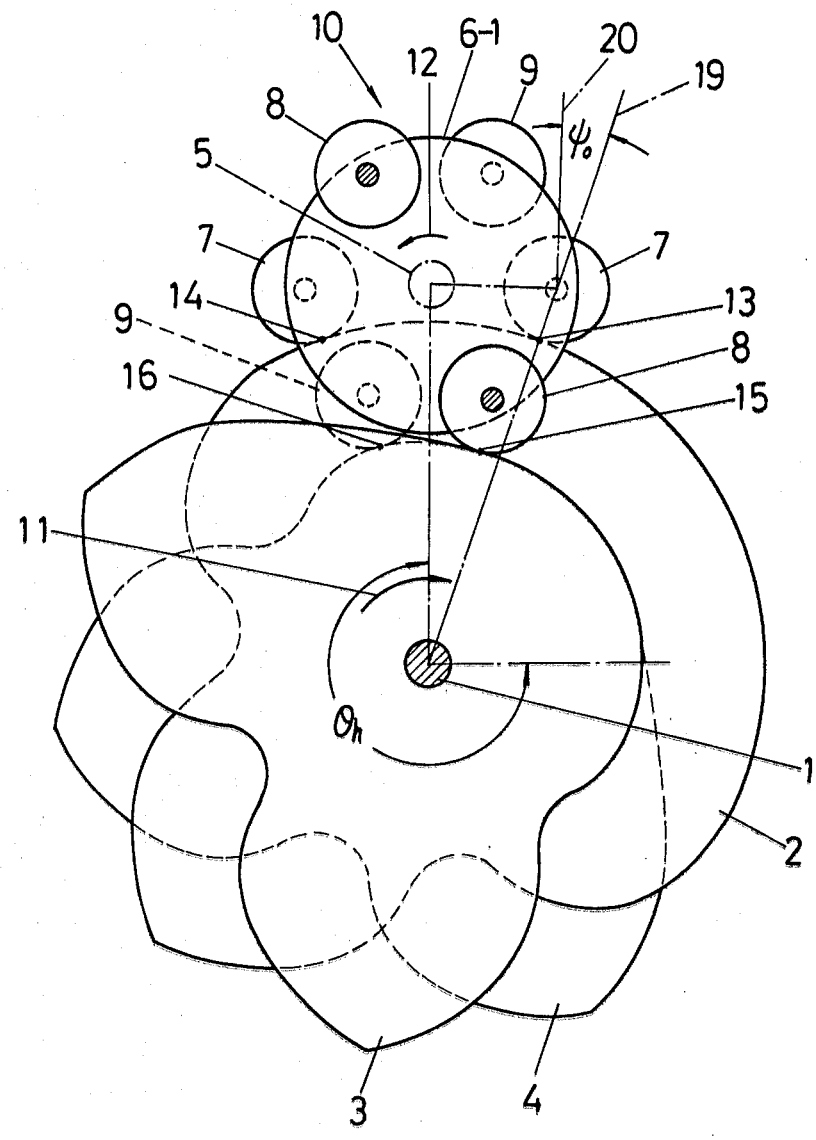
FIG. 1 is a plan view of a first embodiment of the parallel indexing cam structure of the invention, in which the driven shaft is indexed one full rotation.
Figure 2:
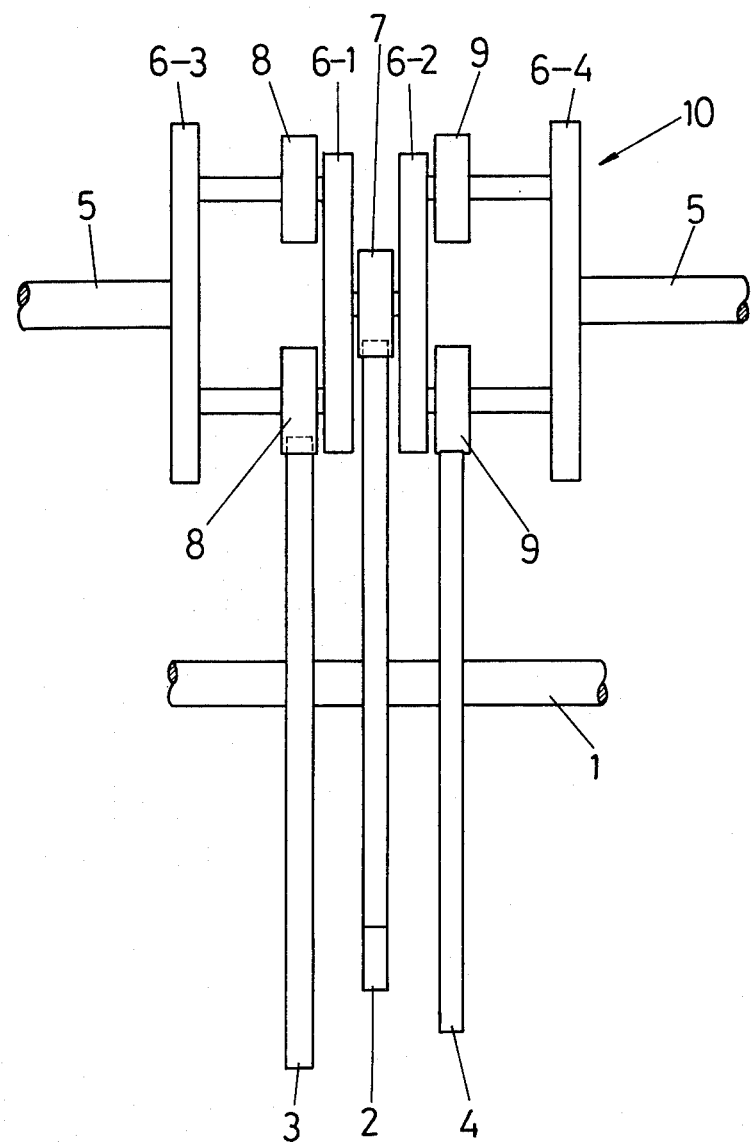
FIG. 2 is a side view of FIG. 1.

Referring first to FIGS. 1 and 2 illustrating the structure of the first preferred embodiment of the invention, cams 2, 3 and 4 are plate-shaped cams having profiles determined by the desired cam curves, and are rigidly secured to an input shaft 1 at predtermined angular positions relative to each other. An output shaft 5 is positioned parallel to the shaft 1, and a follower means in the form of a spider assembly generally shown at 10 is rigidly secured to shaft 5. More particularly, the follower spider assembly 10 includes four members 6-1, 6-2, 6-3 and 6-4 each in the form of a plate, for example. Cam follower rollers 7 which engage the cam member 2 are rotatably supported on pins extending between spider members 6-1 and 6-2 at diametrically opposite positions around spider members 6-1 and 6-2, cam follower rollers 8 which contact the cam member 3 are rotatably supported on pins extending between spider members 6-1 and 6-3 at diametrically opposite positions around spider members 6-1 and 6-3, and cam follower rollers 9 which contact the cam member 4 are rotatably supported on pins extending between spider members 6-1 and 6-4 at diametrically opposite positions around spider members 6-1 and 6-4. In the embodiment illustrated above, rotation of the input shaft 1 through an index angle $\theta_h$ in the direction indicated by arrow 11 causes the cam 3 angularly to move the rollers 8, the cam 4 angularly to move the rollers 9, and so on in that manner, resulting in one rotation of the output shaft 5 in the direction indicated by arrow 12, while during the remaining $360 - \text{(minus)} \ \theta_h°$ of rotation of the input shaft 1, the output shaft 5 will not rotate, i.e. it will dwell. The positions of the various parts during the dwell period is shown in FIG. 1, and during the dwell the spider assembly 10 secured to the output shaft 5 is restrained from movement by contact at points 13 and 14 between the cam 2 and the cam rollers 7, at point 15 where the cam 3 engages the roller 8, and at point 16 where the cam 4 engages the roller 9 cam 2 thus functioning as a locking cam.

Figure 3:
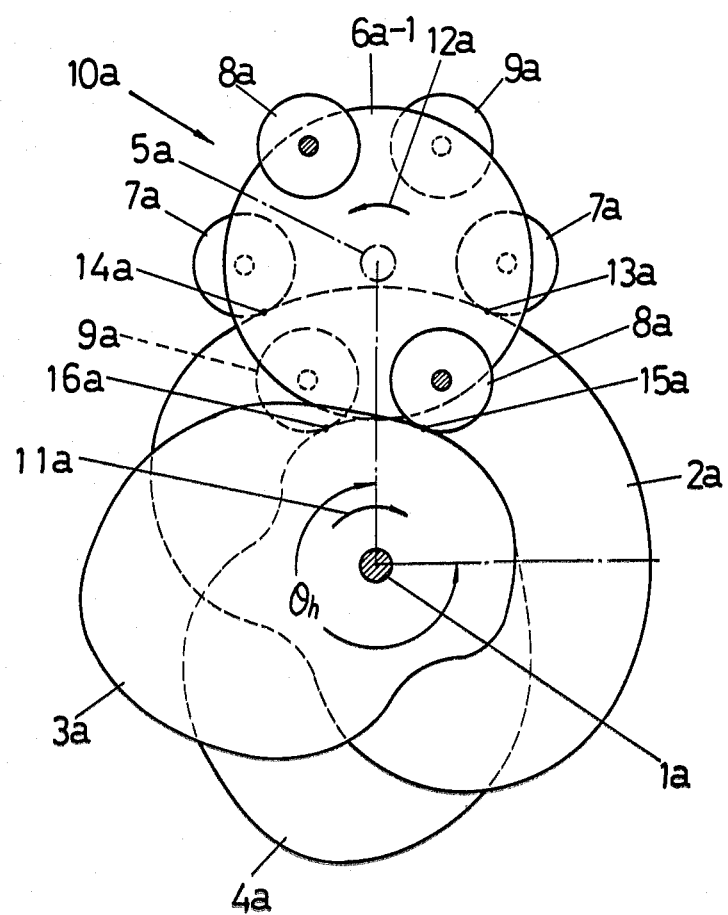
FIG. 3 is a plan view of a second embodiment of the cam structure of the invention, in which the driven shaft is indexed with two stops.

In a second preferred embodiment shown in FIG. 3, the structure of the cam assembly is similar to the first embodiment described above. In FIG. 3, cams 2a, 3a and 4a which are plate-type cams having profiles previously determined by the desired cam curves, are rigidly secured to an input shaft 1a at predetermined angular positions relative to each other. An output shaft 5a is positioned parallel to the input shaft 1a, and a follow spider assembly 10a is rigidly mounted on shaft 5a. The follower spider assembly 10a includes four members 6a-1, 6a-2, 6a-3 and 6a-4 each having a plate shape. Cam follower rollers 7a engage the cam 2a and are rotatably supported on pins between spider members 6a-1 and 6a-2, cam follower rollers 8a contact the cam 3a and are also rotatably supported on pins between spider members 6a-1 and 6a-3, and cam follower rollers 9a contact the cam 4a and are also rotatably supported on pins between spider members 6a-1 and 6a-4. In the second embodiment illustrated above, rotation of the input shaft 1a through an index angle of $\theta_h$ degrees in the direction indicated by the arrow 11a causes a 180° rotation of the output shaft 5a in the direction of arrow 12a, while during the remaining 360 minus $\theta_h°$ of rotation of the input shaft 1a, the output shaft 5a will remain motionless in a so called dwell period. The positions of the parts during the dwell period is shown in FIG. 3, and during the dwell period the spider assembly 10a is restrained from movement by contact at points 13a and 14a between the cam 2a and the cam follower rollers 7a, at point 15a between the cam 3a and the cam follower roller 8a, and at point 16a between the cam 4a and the cam follower roller 9a.

Figure 4:
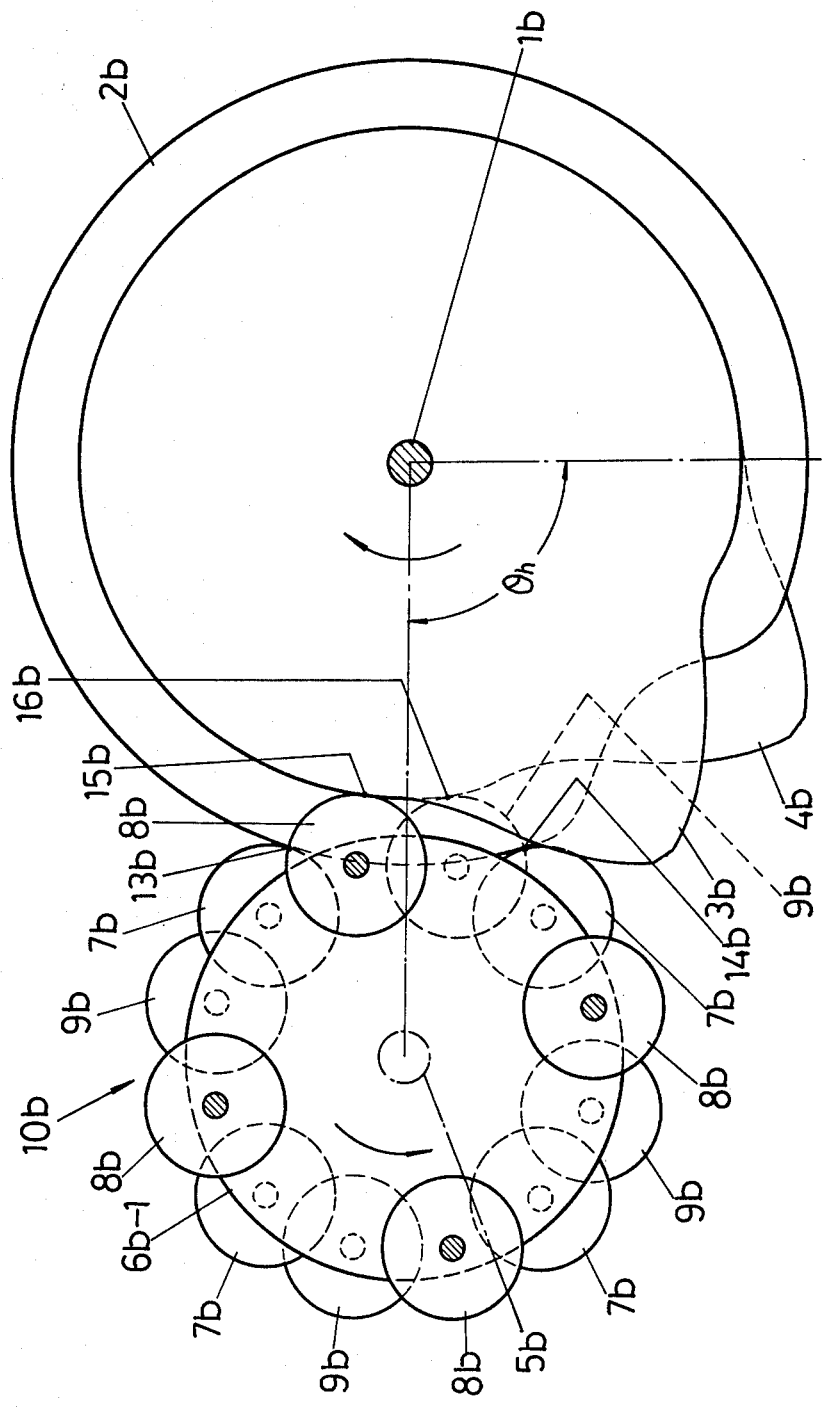
FIG. 4 is a plan view of a third embodiment of the invention in which the driven shaft is indexed with four stops.
Figure 5:
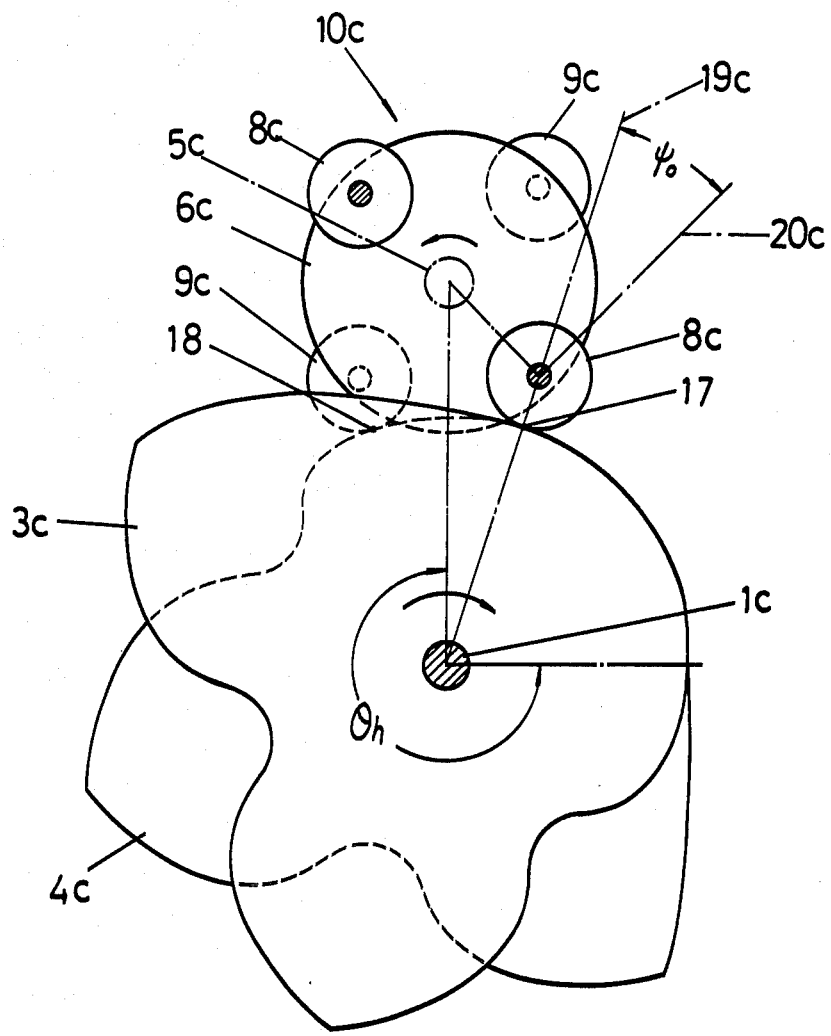
FIG. 5 is a plan view of a conventional parallel indexing cam structure having two cams and corresponding follower rollers.

In the third embodiment shown in FIG. 4, the structure is similar to the two above-described embodiments. In FIG. 4, cams 2b, 3b and 4b have predetermined profiles, and are rigidly secured to an input shaft 1b in predetermined angular positions relative to each other. An output shaft 5b is positioned parallel to the input shaft 1b, and a follower spider assembly generally shown at 10b is rigidly mounted on shaft 5b. The spider assembly 10b has four members 6b-1, 6b-2, 6b-3 and 6b-4 each having a disc shape. Three sets of four cam follower rollers each, i.e. rollers 7b, rollers 8b and rollers 9b engage the corresponding cam members 2b, 3b and 4b, and are rotatably supported on pins between and spaced circumferentially around the corresponding members 6b-1, 6b-2, 6b-3 and 6b-4. In the embodiment of FIG. 4, upon rotation of the input shaft 1b through an index angle of $\theta h°$ in the direction of the arrow as shown, the output shaft 5b will rotate through a distance of 90°, while during the remaining 360 minus $\theta_h$ degrees of rotation of the input shaft 1b, the output shaft 5b will remain in a dwell period. As shown in FIG. 4, during the dwell period, the spider assembly 10b is restrained from movement by contact at points 13b and 14b between the cam 2b and the cam follower rollers 7b, at point 15b between the cam 3b and the cam follower roller 8b and at point 16b between the cam 4b and the cam follower roller 9b. In FIG. 5 is shown the conventional parallel indexing cam structure which comprises two cams and corresponding cam follower means secured to corresponding parallel shafts. For easier understanding of the construction, features and advantages of the invention, the conventional cam structure will be described below with reference to FIG. 5. To an input shaft 1c are rigidly secured two cams 3c and 4c, and to an output shaft 5c are rigidly secured three follower spider discs 6c, between which cam follower rollers 8c and 9c are rotatably mounted on corresponding shafts and which rollers engage the corresponding cams 3c and 4c. It is noted from the above that upon rotation of the input shaft 1c through the predetermined index angle of $\theta_h$, the output shaft 5c will move through a distance of the predetermined angle (360° shown in FIG. 5), and during the dwell period the spider assembly 10c will be restrained from movement by contact at point 17 between the cam 3c the cam follower roller 8c and at point 18 between the cam 4c and the cam follower roller 9c. Because of the differences which are readily understood from the foregoing in operation, the conventional cam structure has fewer points of contact between the cams and the cam follower means, whereas the device of the invention has more points of contact. Because of the increase of number of points of contact between the cams and cam follower means, the loads upon the cam structure of the present invention can be reduced resulting in operation of the cam structure with great stability and accuracy.

In conjunction with the structure of the invention disclosed herein and for a full understanding thereof, the pressure angle, which is closely associated with and may influence the accuracy with which the cam follower rollers remain in position during the dwell period, will now be discussed. The pressure angle $\psi o$ during the dwell period can be defined as the angle between a line linking the center of a given cam follower roller and the center of curvature of the cam surface at the point of contact between the cam and the given cam follower roller, and the direction of movement of the cam follower roller. In the embodiment of FIG. 1, for example, the pressure angle $\psi o$ during the dwell period is indicated by the angle formed by the lines 19 and 20, whereas the conventional cam structure shown in FIG. 5 has an angle of pressure $\psi o$ formed by the lines 19c and 20c. Comparative data between the conventional cam structure and the cam structure of the invention are set forth in the Table below, which shows angles of pressure obtained by calculation for each number of stops.

Table

| Number of Stops | 1/c | $\phi o$(degrees) (conventional) | $\phi o$(degrees) (invention) |
|---|---|---|---|
| 1 | 0.35 | 26.8 | 19.3 |
| 2 | 0.35 | 26.8 | 19.3 |
| 3 | 0.43 | 41.1 | 4.6 |
| 4 | 0.40 | 53.9 | 23.5 |
| 5 | 0.40 | 60.7 | 34.8 |
| 6 | 0.35 | 67.2 | 45.9 |
| 7 | 0.38 | 72.0 | 54.9 |

In the above table, $l$ is the radius of the cam roller pitch circle, and $c$ is the distance between the input and output shafts. As is apparent from the table, the cam structure according to the invention provides reduced angles of pressure for every number of stops, the reduction being appreciably greater in the present invention than in the conventional cam structure, and therefore the present invention makes it possible for the cam follower rollers to have a dwell with greater accuracy.

In the foregoing embodiments, it has been described that the output shaft has 1, 2 or 4 stops, but the number of stops may be 1 to 8 or more depending on particular applications.

Figure 6:
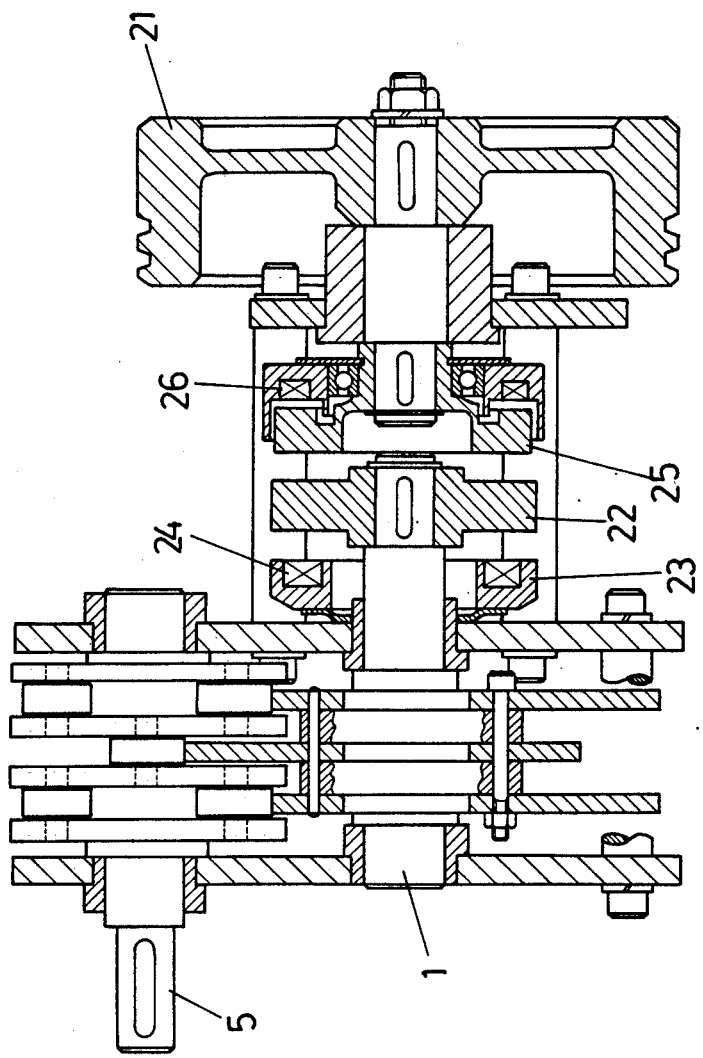
FIG. 6 is a front view of a one revolution-and-stop apparatus employing the embodiment of FIGS. 1 and 2, in which the driven shaft will have one full rotation for each indexing thereof through an angle of 360°.

One revolution-and-stop apparatus is shown in FIG. 6, which employs and incorporates therein the embodiment shown in FIGS. 1 and 2. As shown in detail in FIG. 6, to the input shaft 1 is secured a V-pulley flywheel 21 and intermediate electrical brake and clutch assemblies. The brake assembly includes an armature 22 and a braking disc 23, the braking disc 23 having an electromagnet 24 therein which electromagnetically attracts the armature 22 toward the braking disc 23. The clutch assembly includes a clutch disc 25 positioned opposite the braking disc 23 and having an electromagnet 26 therein which electromagnetically attracts the armature 22 toward the clutch disc 25. In the one revolution-and-stop apparatus described above, driving power is always supplied to the V-pulley flywheel 21 from an appropriate power source, and for starting the apparatus, energizing the electromagnet 26 of the clutch disc 25 causes the armature 22 magnetically to be attracted to the clutch disc 25. At the time when the apparatus is to come to a stop, the cam follower rollers have means thereon engaging an indexing stop which deenergizes the electromagnet 26 while it energizes the electromagnet 24 which magnetically attracts the armature 22 to the braking disc 23. In the first embodiment of FIGS. 1 and 2, the cams 2, 3 and 4 have profiles so designed as to provide the input shaft with a dwell period through a distance of substantially 90°. Therefore, if the cam assembly shown in FIG. 1 is employed in the apparatus as shown in FIG. 6, it permits stopping the apparatus for a determined period of time, which can afford sufficient time for starting or restarting the apparatus of the clutch and braking assemblies, and can also stop those assemblies with considerably less shock and noise.

In accordance with the invention which has been described, the parallel indexing cam structure includes three cams and corresponding cam follower means secured to the shafts positioned parallel to each other, respectively. As it is thus constructed, it provides the various advantages which include the reduced angles of pressure during the dwell period thereby producing a greatly improved accuracy of the dwell, and the loads on the cam structure can be reduced at the points where the cams engage the corresponding cam follower rollers, thereby permitting the operation with greater stability and accuracy.

In the one revolution-and-stop apparatus shown in FIG. 6 employing the embodiment of the invention shown in FIGS. 1 and 2, the clutch and braking assemblies are so controlled during the predetermined dwell period that they can be operated for stopping the apparatus, and the stopping of the apparatus can be effected with considerably less shock and noise.

Although the invention has been illustrated by way of the several preferred embodiments thereof, it should be understood that various changes and modifications may be made without departing from the spirit and scope of the invention.

We claim:

1. A parallel indexing cam structure of the type having an input shaft and an output shaft parallel to the input shaft and cam means on said shafts for causing the input shaft to control the movement of the output shaft so that the output shaft achieves controlled intermittent motion, said cam means being an improved cam means comprising:

a locking cam and a pair of further cams rigidly secured to said input shaft at predetermined angular positions relative to each other, said three cams having profiles for driving said output shaft through a predetermined angle upon rotation of said input shaft through a predetermined index angle $\theta_h$ and for causing said output shaft to undergo a dwell period during the further rotation of said input shaft through an angle of 360 minus $\theta_h°$; and cam follower means rigidly secured to said output shaft and having a plurality of spider plates spaced in the direction of the length of said output shaft and three sets of cam follower rollers, each set rotatably mounted between respective pairs of adjacent spider plates and spaced around the periphery of the spider plates, two rollers of one set of said three sets contacting said locking cam and one roller of each of the remaining sets of rollers contacting a respective one of the further cams, and said locking cam having a larger profile circle along the cam periphery contacting the cam rollers in the dwell position of said output shaft than said further cams, whereby said locking cam holds said output shaft in the dwell position with high accuracy and stiffness during the dwell period.

* * * * *